(12) United States Patent
Tanaka

(10) Patent No.: US 9,924,325 B2
(45) Date of Patent: Mar. 20, 2018

(54) INFORMATION PROCESSING APPARATUS, INFORMATION PROCESSING METHOD, PROGRAM, AND INFORMATION PROCESSING SYSTEM

(71) Applicant: Sony Corporation, Tokyo (JP)

(72) Inventor: Toshiharu Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 3 days.

(21) Appl. No.: 14/414,989

(22) PCT Filed: Sep. 11, 2013

(86) PCT No.: PCT/JP2013/005363
§ 371 (c)(1),
(2) Date: Jan. 15, 2015

(87) PCT Pub. No.: WO2014/041797
PCT Pub. Date: Mar. 20, 2014

(65) Prior Publication Data
US 2015/0189476 A1 Jul. 2, 2015

(30) Foreign Application Priority Data
Sep. 12, 2012 (JP) ................... 2012-200406

(51) Int. Cl.
*H04W 4/02* (2009.01)
*H04W 64/00* (2009.01)

(52) U.S. Cl.
CPC ........... *H04W 4/027* (2013.01); *H04W 4/028* (2013.01); *H04W 64/006* (2013.01)

(58) Field of Classification Search
CPC . H04W 4/027; H04W 4/028; H04M 1/72572; H04M 2250/10; H04M 2201/38; H04M 2242/30; H04M 3/42348; G01C 21/206
See application file for complete search history.

(56) References Cited

U.S. PATENT DOCUMENTS

2010/0211308 A1 8/2010 Zheng et al.
2012/0016584 A1* 1/2012 Nakashima ................... 701/428

FOREIGN PATENT DOCUMENTS

JP 2002-342557 11/2002

OTHER PUBLICATIONS

Quercia, et al., Recommending Social Events from Mobile Phone Location Data, 2010 IEEE International Conference on Data Mining, 2010, p. 971-976.
Spaccapietra, et al., Adding Meaning to Your Steps (Keynote Paper), 2011, p. 1-31.
Kjeldskov, et al., Just-for-Us: A Context-Aware Mobile Information System Facilitating Sociality, MobileHCI'05, Sep. 19-22, 2005, p. 23-30, Salzburg, Austria.

* cited by examiner

*Primary Examiner* — Kabir A Timory
(74) *Attorney, Agent, or Firm* — Paratus Law Group, PLLC

(57) ABSTRACT

There is provided an information processing system including an acquisition section configured to acquire a movement direction and a movement purpose from each one of a plurality of terminal devices; and a guide information issuing section configured to issue a guide information which is generate based on the movement direction and the movement purpose of the a plurality of terminal devices.

23 Claims, 10 Drawing Sheets

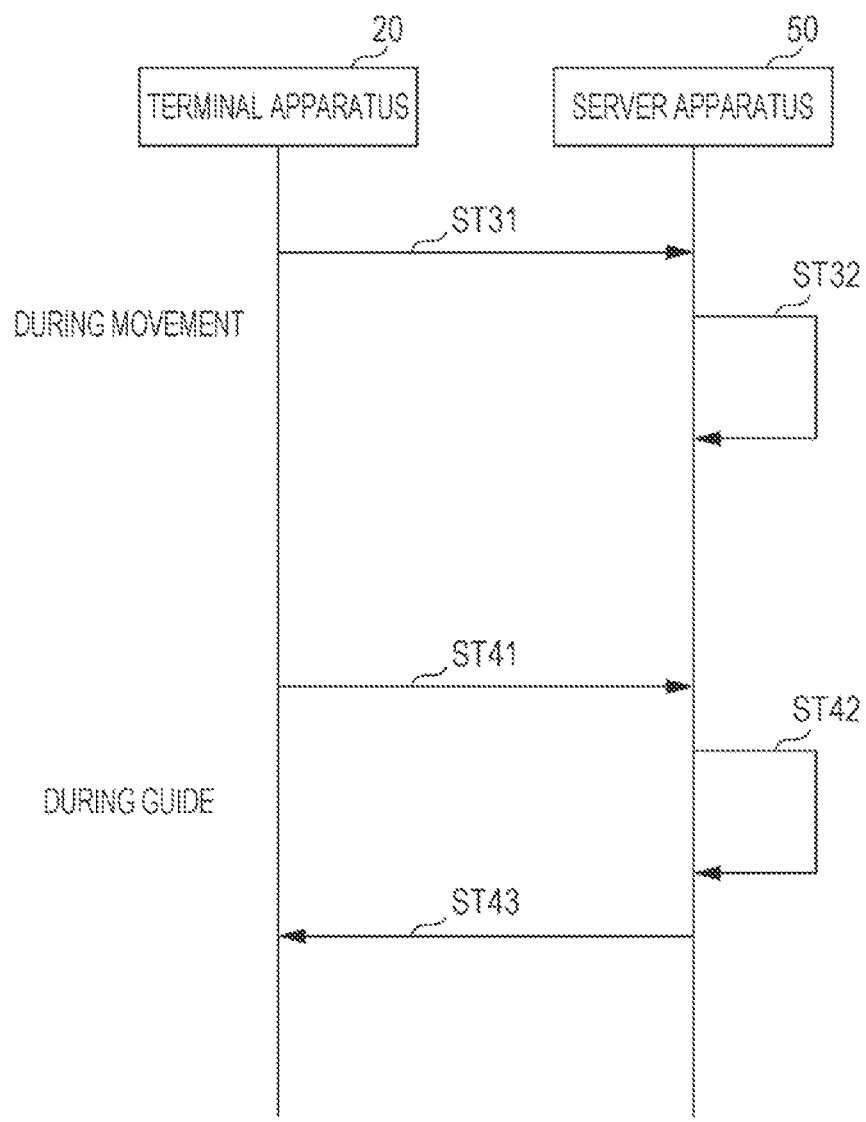

INFORMATION PROCESSING APPARATUS, INFORMATION PROCESSING METHOD, PROGRAM, AND INFORMATION PROCESSING SYSTEM

CROSS REFERENCE TO PRIOR APPLICATION

This application is a National Stage Patent Application of PCT International Patent Application No. PCT/JP2013/005363 (filed on Sep. 11, 2013) under 35 U.S.C. § 371, which claims priority to Japanese Patent Application No. 2012-200406 (filed on Sep. 12, 2012), which are all hereby incorporated by reference in their entirety.

TECHNICAL FIELD

The present technology relates to an information processing apparatus, an information processing method, a program, and an information processing system, and makes it possible to grasp the situation of movement including the purpose of movement and provide useful information.

BACKGROUND ART

In related art, the situation of people's movement or the like is statistically grasped. For example, a method used for this purpose is to place a surveyor at each of a plurality of survey points, and count the movements of people. In PTL 1, positional information transmitted from each portable terminal (cellular phone or PHS) via a base station in each area is acquired, and the situation of people's movement or the like is statistically grasped from the counted value of the number of receptions of positional information in each area in a predetermined observation time period.

CITATION LIST

Patent Literature

[PTL 1]
Japanese Unexamined Patent Application Publication No. 2002-342557

SUMMARY

Technical Problem

In a case where the situation of movement is grasped by using the counted value of the movements of people or the counted value of the number of receptions of positional information in each area, it is not possible to grasp for what purpose people are moving. Therefore, the applicability of the grasped situation of movement is limited, and it is not possible to make effective use of the situation of movement.

It is desirable to provide an information processing apparatus, an information processing method, a program, and an information processing system which can grasp the situation of people's movement including the purpose of movement and provide useful information.

Solution to Problem

According to an embodiment of the present technology, there is provided an information processing apparatus including a movement information acquiring section that acquires movement information from external apparatuses, the movement information including positions acquired during movement, position acquisition times, and a purpose of movement, and a guide information generating section that performs, for each of the external apparatuses, selection of movement information indicating positions within a movement direction search range from the movement information acquired by the movement information acquiring section, and identification of a direction of movement based on positions and position acquisition times of the selected movement information, and generates guide information indicating the identified direction of movement and a purpose of movement for the direction of movement.

In the embodiment of the present technology mentioned above, the movement information acquiring section acquires movement information including positions acquired during movement, position acquisition times, and a purpose of movement from external apparatuses. The guide information generating section performs, for each of the external apparatuses, selection of movement information indicating positions within a movement direction search range from the acquired movement information, and identification of a direction of movement based on positions and position acquisition times of the selected movement information. For example, the guide information generating section uses the positions of the selected movement information in order of their position acquisition times to calculate a movement vector between the positions, and identifies the direction of movement on a basis of the calculated movement vector. Further, the guide information generating section generates guide information indicating the identified direction of movement and a purpose of movement for the direction of movement. In determining the purpose of movement for the direction of movement, for example, the guide information generating section identifies the frequency for each purpose of movement, and determines the purpose of movement for the direction of movement on the basis of the identification results. Also, in selecting movement information, in accordance with designation of a time period, the guide information generating section selects movement information including position acquisition times within the designated time period. Also, information on sex or age is included in the movement information, and the guide information generating section selects movement information indicating a sex designated in accordance with sex designation, and selects movement information indicating an age range that is set on the basis of an age designated in accordance with age designation. In accordance with designation of a purpose of movement, the guide information generating section selects a direction of movement corresponding to the designated purpose of movement from directions of movement individually identified for the external apparatuses, and generates guide information indicating the selected direction of movement. Also, in accordance with designation of a position range for which to present the guide information, the guide information generating section divides the position range into regions, and generates the guide information by setting each of the divided regions as the movement direction search range. Further, a guide presenting section that presents a direction of movement and a purpose of movement on the basis of the generated guide information is provided. Also, a position acquiring section that acquires the current position is provided, and the guide information generating section generates the guide information by setting the movement direction search range with reference to the current position acquired by the position acquiring section.

According to an embodiment of the present technology, there is provided an information processing apparatus including a guide information requesting section that makes a request for guide information to a guide information generating apparatus, the guide information generating apparatus being configured to acquire movement information including positions acquired during movement, position acquisition times, and a purpose of movement from external apparatuses, perform, for each of the external apparatuses, selection of movement information indicating positions within a movement direction search range from the acquired movement information, and identification of a direction of movement based on positions and position acquisition times of the selected movement information, and generate the guide information indicating the identified direction of movement and a purpose of movement for the direction of movement, and a guide presenting section that presents a direction of movement and a purpose of movement, on a basis of the guide information supplied from the guide information generating apparatus in response to the request for the guide information.

In the embodiment of the present technology mentioned above, the guide information requesting section makes a request for guide information to the guide information generating apparatus. The guide information generating apparatus acquires movement information including positions acquired during movement, position acquisition times, and a purpose of movement from external apparatuses, performs, for each of the external apparatuses, selection of movement information indicating positions within a movement direction search range from the acquired movement information, and identification of a direction of movement based on positions and position acquisition times of the selected movement information, and generates the guide information indicating the identified direction of movement and a purpose of movement for the direction of movement. The guide presenting section presents a direction of movement and a purpose of movement, on the basis of the guide information supplied from the guide information generating apparatus in response to the request for the guide information. For example, the guide presenting section displays a map, and displays a direction of movement and a purpose of movement on the map on the basis of the guide information. Also, the guide presenting section displays a captured image captured by an imaging section, and displays a direction of movement and a purpose of movement on the captured image on the basis of the guide information while aligning the azimuth of the captured image acquired by an azimuth acquiring section with the azimuth in the direction of movement.

According to an embodiment of the present technology, there is provided an information processing method including acquiring movement information from external apparatuses, the movement information including positions acquired during movement, position acquisition times, and a purpose of movement, and performing, for each of the external apparatuses, selection of movement information indicating positions within a movement direction search range from the acquired movement information, and identification of a direction of movement based on positions and position acquisition times of the selected movement information, and generating guide information indicating the identified direction of movement and a purpose of movement for the direction of movement.

According to an embodiment of the present technology, there is provided a program for causing a computer to execute generation of guide information, the generation of guide information including acquiring movement information from external apparatuses, the movement information including positions acquired during movement, position acquisition times, and a purpose of movement, and performing, for each of the external apparatuses, selection of movement information indicating positions within a movement direction search range from the acquired movement information, and identification of a direction of movement based on positions and position acquisition times of the selected movement information, and generating guide information indicating the identified direction of movement and a purpose of movement for the direction of movement.

It is to be noted that the computer program according to an embodiment of the present technology is a computer program that can be provided to a general purpose computer capable of executing various program codes via a storage medium or communication medium that is provided in a computer-readable format, for example, a storage medium such as an optical disc, a magnetic disk, or a semiconductor memory, or a communication medium such as a network. By providing such a program in a computer-readable format, processes corresponding to the program are implemented on the computer.

According to an embodiment of the present technology, there is provided an information processing system including at least one first information processing apparatus that generates movement information including positions acquired during movement, position acquisition times, and a purpose of movement, a second information processing apparatus that acquires the movement information generated by the first information processing apparatus, selects movement information indicating positions within a movement direction search range from the acquired movement information, identifies a direction of movement on a basis of positions and position acquisition times of the selected movement information, and generates guide information indicating the identified direction of movement and a purpose of movement for the direction of movement, and a third information processing apparatus that makes a request for the guide information to the second information processing apparatus, and presents a guide on a basis of the guide information generated by the second information processing apparatus in response to the request.

Advantageous Effects of Invention

According to an embodiment of the present technology, movement information including positions acquired during movement, position acquisition times, and a purpose of movement is acquired from external apparatuses, and for each of the external apparatus, movement information indicating positions within a movement direction search range is selected from the acquired movement information, and a direction of movement is identified on the basis of positions and position acquisition times of the selected movement information. Further, guide information indicating the identified direction of movement and a purpose of movement for the direction of movement is generated. Consequently, by presenting the guide information, the user can grasp the situation of people's movement including the purpose of movement, and can utilize the guide information as, for example, useful information for deciding what to do from now on.

BRIEF DESCRIPTION OF DRAWINGS

FIG. 8 is a sequence diagram illustrating the operations of the terminal apparatus and server apparatus.

DESCRIPTION OF EMBODIMENT

Hereinafter, an embodiment of the present technology will be described. The description will be given in the following order.
1. Configuration of Information Processing System
2. Configuration of Terminal Apparatus
3. Configuration of Server Apparatus
4. Operations of Terminal Apparatus and Server Apparatus
5. Other Operations of Terminal Apparatus and Server Apparatus
6. Anther Configuration and Operation of Terminal Apparatus (1. Configuration of Information Processing System)

An information processing system has a first information processing apparatus, a second information processing apparatus, and a third information processing apparatus. The first information processing apparatus generates movement information including positions acquired during movement, position acquisition times, and a purpose of movement. The second information processing apparatus acquires the movement information generated by the first information processing apparatus, and selects movement information indicating positions within a movement direction search range from the acquired movement information. The second information processing apparatus also identifies a direction of movement on the basis of positions and position acquisition times of the selected movement information, and generates guide information indicating the identified direction of movement and a purpose of movement for the direction of movement. The third information processing apparatus makes a request for guide information to the second information processing apparatus, and presents a guide on the basis of guide information generated in the second information processing apparatus in response to this request.

Figure 1:
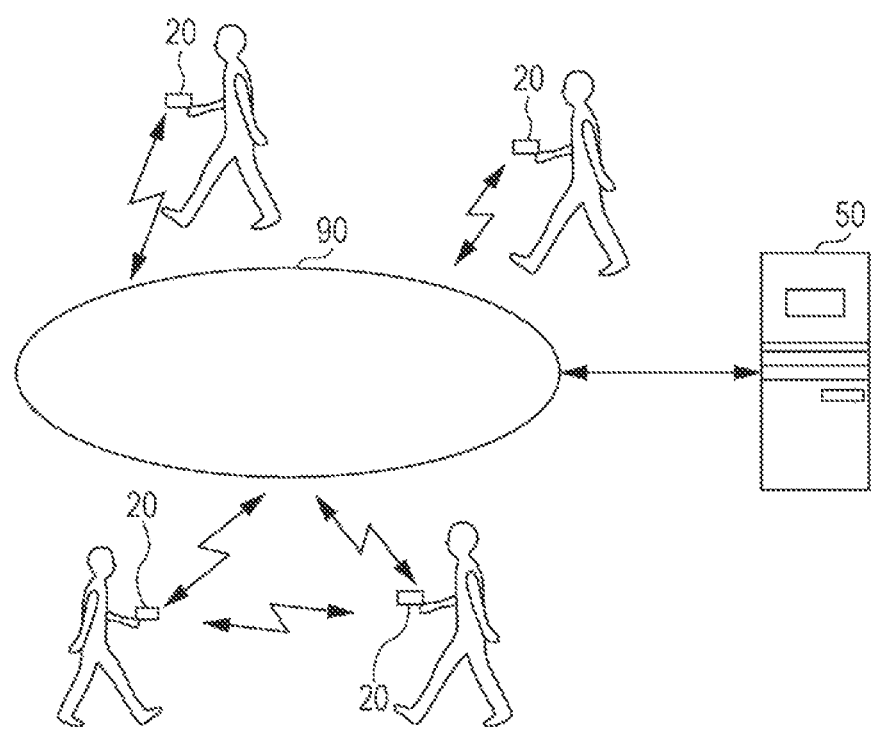
FIG. 1 illustrates a configuration of an information processing system.

FIG. 1 illustrates a configuration of the information processing system. In FIG. 1, a terminal apparatus 20 corresponds to the first information processing apparatus or the third information processing apparatus. A server apparatus 50 corresponds to the second information processing apparatus. The terminal apparatus 20 may operate as the second information processing apparatus and the third information processing apparatus.

The terminal apparatus 20 and the server apparatus 50 are connected via, for example, a network 90 such as a public communication network. The user's terminal apparatus 20 and another terminal apparatus 20 are connected via, for example, a radio transmission path.

In the following, the description will be given for a case where guide information is generated in the server apparatus 50 in response to a request for guide information from the terminal apparatus 20, and the generated guide information is supplied to the terminal apparatus 20 to thereby present the guide information.

(2. Configuration of Terminal Apparatus)

The terminal apparatus 20 has a position acquisition function, a communication function with the server apparatus 50, and a presentation function for guide information. The terminal apparatus 20 may also have the function of displaying the current position on a map, a navigation function for guiding the route to a destination, or the like. As the terminal apparatus 20, for example, a portable terminal such as a cellular phone, a smart phone, a personal digital assistant (PDA), or a tablet terminal, a navigation apparatus, or the like is used.

Figure 2:
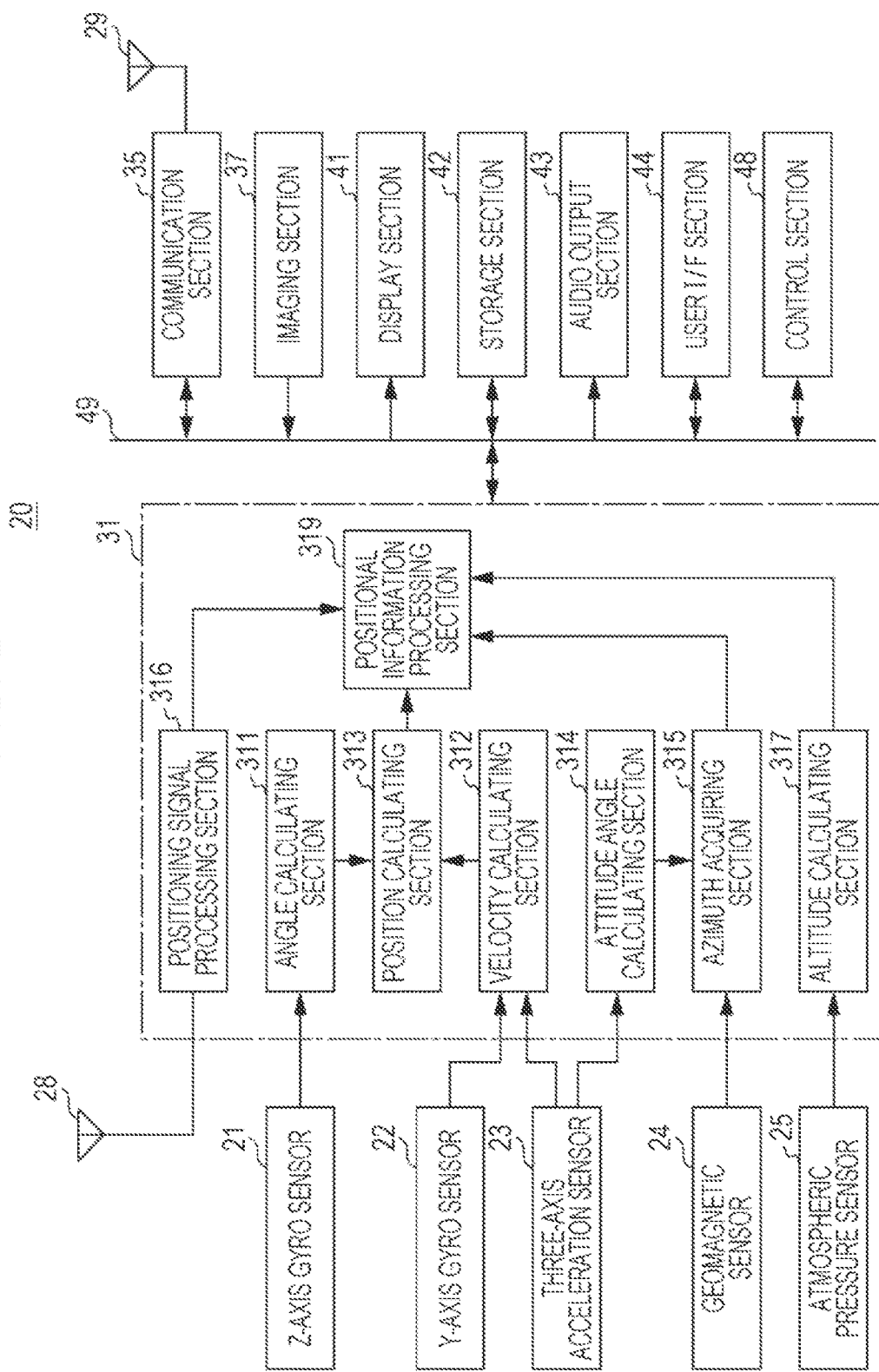
FIG. 2 illustrates a configuration of a terminal apparatus.

FIG. 2 illustrates a configuration of the terminal apparatus 20. The terminal apparatus 20 has a Z-axis gyro sensor 21, a Y-axis gyro sensor 22, a three-axis acceleration sensor 23, a geomagnetic sensor 24, an atmospheric pressure sensor 25, and antennas 28 and 29. The terminal apparatus 20 also has a position acquiring section 31, a communication section 35, a display section 41, a storage section 42, an audio output section 43, a user interface section 44, and a control section 48. Further, the position acquiring section 31 has an angle calculating section 311, a velocity calculating section 312, a position calculating section 313, an attitude angle calculating section 314, an azimuth acquiring section 315, a positioning signal processing section 316, an altitude calculating section 317, and a positional information processing section 319. The position acquiring section 31 acquires the current position of the terminal apparatus 20.

Figure 3:
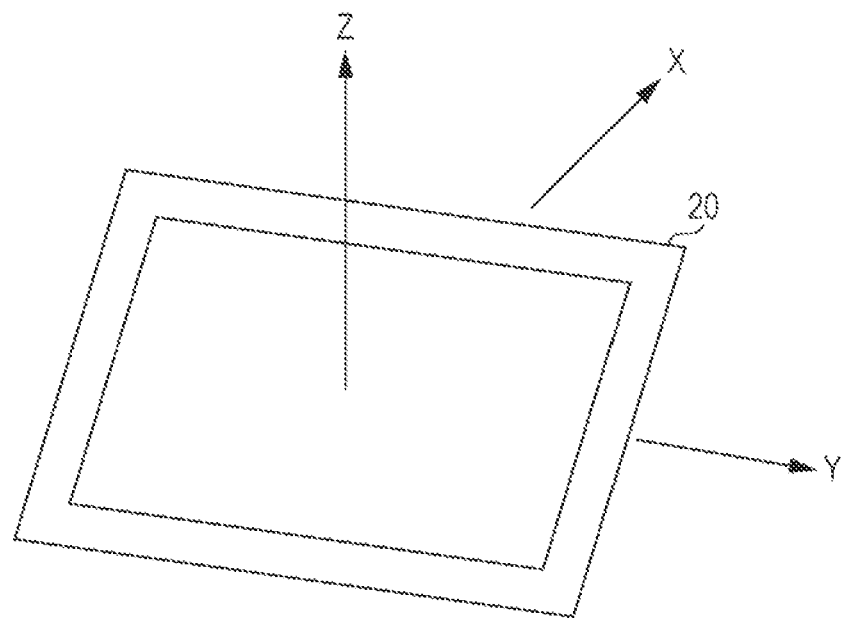
FIG. 3 illustrates the relationship between the axis of a Z-axis gyro sensor and direction.

The Z-axis gyro sensor 21 detects yawing that is a motion around the Z-axis. The Z-axis gyro sensor 21 detects a yaw rate wz, which is the velocity (angular velocity) of change of the rotational angle around the Z-axis when the terminal apparatus 20 is turning. The Z-axis gyro sensor 21 detects the yaw rate at a sampling frequency of, for example, 50 Hz, and outputs a detection signal indicating the detected yaw rate to the angle calculating section 311 of the position acquiring section 31. As illustrated in FIG. 3, the Z-axis corresponds to the vertical direction. The X-axis corresponds to the advancing direction of the terminal apparatus 20, and the Y-axis corresponds to the horizontal direction orthogonal to the X-axis.

The angle calculating section 311 multiplies the yaw rate wz inputted from the Z-axis gyro sensor 21 by the sampling period to thereby calculate the angle at which the terminal apparatus 20 has turned, and outputs angle data indicating the calculated angle to the position calculating section 313.

The Y-axis gyro sensor 22 detects pitching that is a motion around the Y-axis. The Y-axis gyro sensor 22 detects a pitch rate wy that is the angular velocity around the Y-axis at a sampling frequency of, for example, 50 Hz, and outputs a detection signal indicating the detected pitch rate to the velocity calculating section 312.

The three-axis acceleration sensor 23 detects an acceleration Ax along the X-axis, an acceleration Ay along the Y-axis, and an acceleration Az along the Z-axis. The three-axis acceleration sensor 23 detects the acceleration Ax, the acceleration Ay, and the acceleration Az at a sampling frequency of, for example, 50 Hz, and outputs a detection signal indicating each of the detected accelerations to the velocity calculating section 312 and the attitude angle calculating section 314.

The velocity calculating section 312 calculates a velocity V with respect to the advancing direction, by dividing the acceleration Az along the Z-axis supplied from the three-axis accelerations sensor 23 by the pitch rate wy supplied from the Y-axis gyro sensor 22. The velocity calculating section 312 outputs velocity data indicating the calculated velocity to the position calculating section 313.

The position calculating section 313 calculates the current position on the basis of the velocity detected in the velocity calculating section 312 and the angle calculated in the angle calculating section 311. Specifically, the position calculating section 313 calculates the amount of change from the position calculated last time to the current position on the basis of the velocity and the angle. Then, the position calculating section 313 calculates the current position from this amount of change and the last position. Thereafter, the position calculating section 313 outputs positional data indicating the calculated current position to the positional information processing section 319.

The attitude angle detecting section 314 generates attitude angle data indicating the attitude angle of the terminal apparatus by performing a predetermined attitude angle detecting process on the basis of the detection signal supplied from the three-axis acceleration sensor 23, and outputs the attitude angle data to the azimuth acquiring section 315.

The geomagnetic sensor 24 detects the geomagnetism of each of the X-axis, Y-axis, and Z-axis directions, and outputs geomagnetic data indicating the detection results to the azimuth acquiring section 315.

The azimuth acquiring section 315 applies a predetermined correction process to the geomagnetic data supplied from the geomagnetic sensor 24, and generates azimuth data indicating the azimuth of the terminal apparatus 20 on the basis of the corrected geomagnetic data and the attitude angle data supplied from the attitude angle detecting section 314. The azimuth acquiring section 315 outputs the generated azimuth data to the positional information processing section 319.

That is, the three-axis acceleration sensor 23, the geomagnetic sensor 24, the attitude angle detecting section 314, and the azimuth acquiring section 315 each function as a so-called electronic compass, and generate azimuth data. By using the azimuth data, the positional information processing section 319 can provide the user with a map display while aligning the display with the orientation of the terminal apparatus 20.

The antenna 28 receives positioning signals from a plurality of positioning satellites, for example, signals from global positioning system (GPS) satellites, and outputs the received signals to the positioning signal processing section 316. The received positioning signals each include information such as trajectory data indicating the trajectory of a positioning satellite, and the transmission time of the signal.

The positioning signal processing section 316 calculates the position of each positioning satellite from trajectory data obtained by demodulating each received signal supplied from the antenna 28, and calculates the distance from each positioning satellite to the terminal apparatus 20 from the difference between the transmission time and reception time of the positioning signal. Then, the positioning signal processing section 316 calculates the current three-dimensional position on the basis of the calculated position of each positioning satellite, and the distance from each positioning satellite to the terminal apparatus 20. The positioning signal processing section 316 outputs positional data indicating the calculated three-dimensional position to the positional information processing section 319.

The atmospheric pressure sensor 25 is a sensor that detects the surrounding atmospheric pressure. The atmospheric pressure sensor 25 detects the atmospheric pressure at a sampling frequency of, for example, 50 Hz, and outputs the detected atmospheric pressure data to the altitude calculating section 317.

The altitude calculating section 317 calculates the altitude of the terminal apparatus 20 on the basis of the atmospheric pressure data supplied from the atmospheric pressure sensor 25, and supplies altitude data indicating the calculated altitude to the positional information processing section 319.

The positional information processing section 319 can acquire the current position from the position calculating section 313 and the positioning signal processing section 316. Further, the positional information processing section 319 can acquire the azimuth in which the terminal apparatus 20 is orientated from the azimuth acquiring section 315, and the altitude of the terminal apparatus 20 from the altitude calculating section 317. That is, the positional information processing section 319 acquires a position by using an absolute position acquiring function and a relative position acquiring function using various sensors. The relative position acquiring function may be used in situations where it is not possible to use the absolute position acquiring function, that is, in situations where the terminal apparatus 20 exists at a position where it is not possible to receive a positioning signal, or may be used in combination with the absolute position acquiring function.

In a case where a navigation function is being used, the positional information processing section 319 reads map data of the vicinity in which the current position is included, and on the basis of azimuth data, the positional information processing section 319 generates a map image in which the current position is included and which is aligned with the current azimuth of the terminal apparatus 20. The positional information processing section 319 displays the generated map image on the screen of the display section 41.

The positional acquiring section 31 may use a position acquiring method using a wireless local area network (LAN) or the like. For example, the position acquiring section 31 may acquire a position on the basis of positional information on each base station (access point) that is registered in advance, and the signal intensity of a radio signal from each base station. Further, it suffices that the position acquiring section 31 be able to acquire the current position, and the various sensors and the like illustrated in FIG. 2 may be omitted as necessary.

The antenna 29 is connected to the communication section 35. The communication section 35 communicates with a base station (not illustrated) via the antenna 29, and communicates with the server apparatus 50 via the network 90. The communication section 35 outputs movement information indicating positions acquired in the position acquiring section 31, position acquisition times, and a purpose of movement to the server apparatus 50. The communication section 35 also outputs a request for guide information to the server apparatus 50. Further, the communication section 35 receives guide information supplied from the server apparatus 50.

The display section 41 is, for example, a display device that outputs a screen obtained by superimposing information indicating the current position on map data. The display section 41 also displays a menu for selecting a function of the terminal apparatus 20, performing various settings, or the like. Further, the display section 41 presents guide information supplied from the server apparatus 50. For example, on the basis of guide information, the display section 41 performs a guide display on direction of movement, purpose of movement, and the like on the screen. The display section 41 is configured by, for example, a display device such as a liquid crystal display (LCD) or an organic electroluminescence (EL) display.

The storage section 42 is a storage medium that stores a program for operating the terminal apparatus 20, map data, and the like. The storage section 42 may be, for example, a storage medium including a non-volatile memory such as a flash ROM (or flash memory), an electrically erasable programmable read-only memory (EEPROM), and an erasable programmable ROM (EPROM), a magnetic disk such as a hard disk and a disk-shaped magnetic body disk, an optical disc such as a digital versatile disc recordable (DVD-R) and a Blu-Ray Disc (BD) (registered trademark), and a magneto optical (MO) disc.

The audio output section 43 is an output device that outputs audio data, and is configured by, for example, a speaker. The audio output section 43 outputs, for example, audio guidance related to navigation. The audio output section 43 also presents guide information supplied from the server apparatus 50. For example, the audio output section 43 provides audio guide on direction of movement, purpose of movement, and the like on the basis of the guide information.

The user interface section 44 is configured by an operating switch or operating button, a touch panel integrally provided on the screen of the display section 41, or the like. The user interface section 44 accepts an operating instruction from the user, and outputs an operation signal indicating information on the operation to the control section 48. Examples of an operating instruction from the user include setting of a destination, enlarging and reducing of a map, audio guide settings, and screen display settings. The user interface section 44 may be a touch screen that is provided integrally with the display section 41. Alternatively, the user interface section 44 may be a physical component provided separately from the display section 41, such as a button, a switch, and a lever. The user interface section 41 may be a signal receiving section that detects an operation signal indicating an operating instruction from the user which is transmitted from a remote control.

The control section 48 causes the terminal apparatus 20 to operate in accordance with a user's operation, by controlling the operation of each section on the basis of an operation signal from the user interface section 44. The control section 48 is configured by a central processing unit (CPU), a read only memory (ROM), a random access memory (RAM), and the like. By executing a program stored in the ROM or the storage section 42, the CPU causes the terminal apparatus 20 to operate in accordance with a user's operation by controlling the operation of each section on the basis of an operation signal from the user interface section 44. For example, the control section 48 requests the server apparatus 50 for guide information by controlling the communication section 35 on the basis of an operation signal. For example, with the current position as a guide position, the control section 48 also inserts information indicating the guide position into a request for guide information.

The control section 48 generates movement information by associating position acquisition times and a purpose of movement with positions acquired in the position acquiring section 31, and outputs the movement information to the server apparatus 50 from the communication section 35. In the case of presenting guide information, the control section 48 outputs a request for guide information to the server apparatus 50 while inserting information indicating a guide position into the request. Further, the control section 48 causes the display section 41 or the audio output section 43 to perform a guide display or output of an audio guide, on the basis of guide information supplied from the server apparatus 50 in response to the request for guide information.

(3. Configuration of Server Apparatus)

The server apparatus 50 processes movement information supplied from each terminal apparatus 20, and generates guide information corresponding to a guide position and outputs the guide information to the terminal apparatus 20 that has requested for the guide information.

Figure 4:
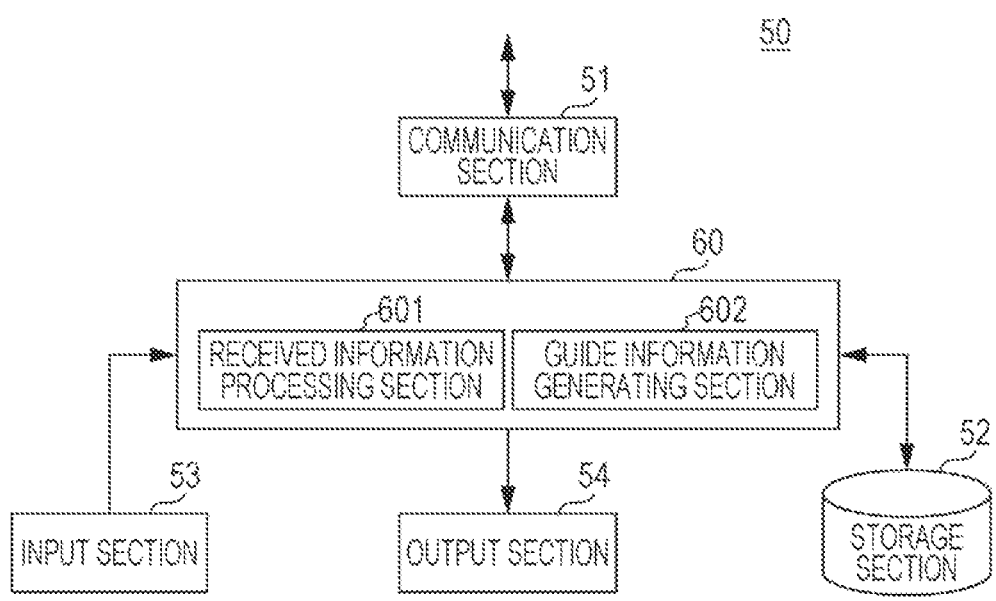
FIG. 4 illustrates a configuration of a server apparatus.

FIG. 4 illustrates a configuration of the server apparatus. The server apparatus 50 has a communication section 51, a storage section 52, an input section 53, an output section 54, and a control section 60. The communication section 51, the storage section 52, the input section 53, and the output section 54 are connected to the control section 60.

The communication section 51 communicates with the terminal apparatus 20 via the network 90. The communication section 51 acquires movement information and a request for guide information which are supplied from the terminal apparatus 20, and supplies the movement information and the request to the control section 60. The communication section 51 also outputs guide information supplied from the control section 60 to the terminal apparatus 20.

The storage section 52 stores movement information supplied from each terminal apparatus 20. The storage section 52 is configured by a hard disk drive (HDD), a non-volatile memory, or the like. The storage section 52 may be provided separately from the server apparatus 50.

The input section 53 is configured by a keyboard, a pointing device, or the like. Information or the like is inputted with the input section 53. The output section 54 is configured by a liquid crystal display or the like. The output section 54 displays movement information stored in the storage section 52, guide information, or the like.

The control section 60 is configured by a central processing unit (CPU), a read only memory (ROM), a random access memory (RAM), and the like. The CPU executes various kinds of processing in accordance with a program stored in the ROM or the storage section 52. Data or the like necessary for the CPU to execute various kinds of processing is stored in the RAM as appropriate.

The control section 60 has a received information processing section 601 and a guide information generating section 602. The processing in each of the received information processing section 601 and the guide information generating section 602 may be performed by the CPU.

The received information processing section 601 performs a process of storing movement information supplied from each terminal apparatus 20. The received information processing section 601 causes the storage section 52 to store movement information from each terminal apparatus 20 in such away that can distinguish from which terminal apparatus each information is supplied.

The guide information generating section 602 generates guide information from movement information stored in the storage section 52. The guide information generating section 602 sets a movement direction search range with reference to a guide position indicated in a request for guide information. The guide information generating section 602 also performs, for each terminal apparatus, selection of movement information that indicates positions within the movement direction search range, and identification of a direction of movement based on the positions and position acquisition times of the selected movement information, and generates guide information indicating the identified direction of movement and a purpose of movement for this direction of movement. For example, by using positions within the movement direction search range in time series on the basis of their position acquisition times, the guide information generating section 602 identifies the directions of movement of the positions. Further, the guide information generating section 602 calculates the average of the identified directions, and identifies which one of pre-defined directions the average of the directions of movement corresponds to. By performing such processing for each terminal apparatus, the guide information generating section 602 determines the direction of movement for each terminal apparatus. The determined direction of movement is associated with a purpose of movement. By performing such processing, the guide information generating section 602 identifies the direction of movement and purpose of movement of a terminal apparatus that has moved within the movement direction search range. Further, the guide information generating section 602 performs statistical processing to identify the frequency of direction of movement and the frequency of purpose of movement for each direction of movement, the frequency of purpose of movement and the frequency of direction of movement for each purpose of movement, and the like. The guide information generating section 602 generates guide information on the basis of the results of such statistical processing. As guide information, for example, information indicating directions of movement in order of frequency, or information indicating purposes of movement in order of frequency for each direction of movement may be generated. Further, information indicating purposes of movement in order of frequency, or information indicating directions of movement in order of frequency for each purpose of movement may be generated.

(4. Operations of Terminal Apparatus and Server Apparatus)

Figure 5:
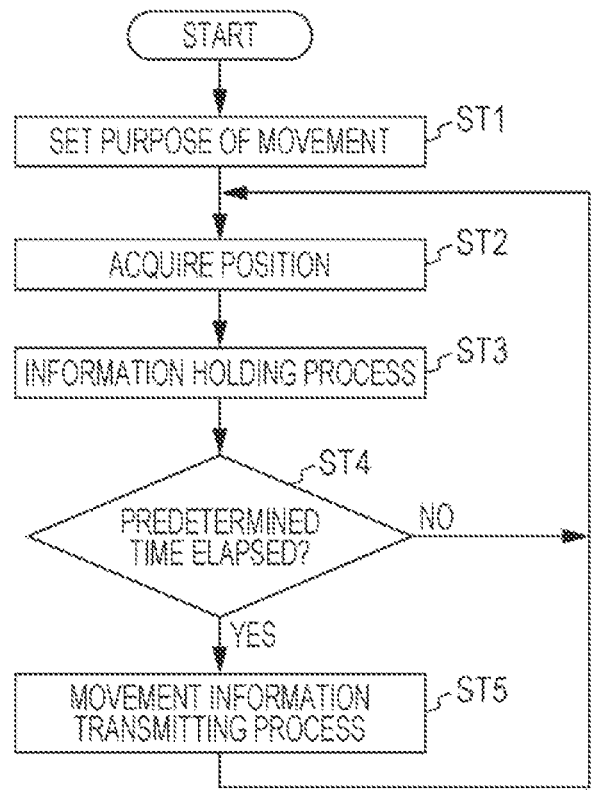
FIG. 5 is a flowchart illustrating a movement direction transmitting operation.

FIG. 5 is a flowchart illustrating a movement direction transmitting operation. In step ST1, the terminal apparatus 20 sets a purpose of movement. The terminal apparatus 20 sets a purpose of movement on the basis of, for example, an input operation of a purpose of movement by the user. The terminal apparatus 20 causes the set purpose of movement to be temporarily stored in, for example, the storage section 42, and proceeds to step ST2.

In step ST2, the terminal apparatus 20 acquires a position. The terminal apparatus 20 acquires a position indicating the current position by the position acquiring section 31, and proceeds to step ST3.

In step ST3, the terminal apparatus 20 performs a movement information holding process. The terminal apparatus 20 causes the acquired position to be temporarily stored in the storage section 42 or the like in association with its position acquisition time, and proceeds to step ST4.

In step ST4, the terminal apparatus 20 identifies whether or not a predetermined time period has elapsed. The terminal apparatus 20 returns to step ST2 in a case where a predetermined time period has not elapsed since the start of the transmitting operation or the transmission of movement information, and proceeds to step ST5 in a case where the predetermined time period has elapsed.

In step ST5, the terminal apparatus 20 performs a movement information transmitting process. The terminal apparatus 20 generates movement information by associating position acquisition times and a purpose of movement with stored positions, transmits the generated movement information from the communicating section 35, and returns to step ST2.

In this way, the terminal apparatus 20 acquires positions during movement, generates movement information by associating position acquisition times and a purpose of movement with acquired positions, and transmits the movement information to the server apparatus 50.

Figure 6:
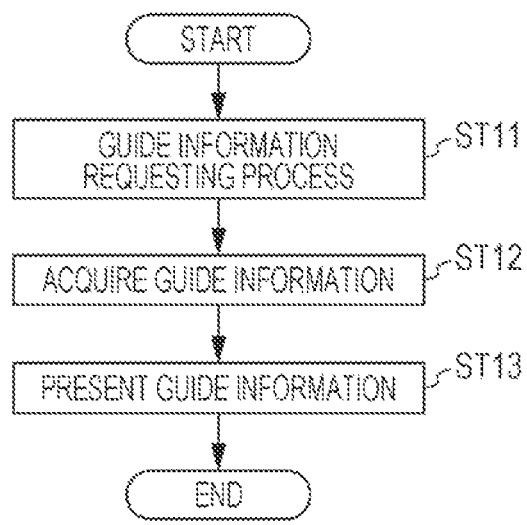
FIG. 6 is a flowchart illustrating a guide information presenting process.

Next, presentation of guide information will be described. The presentation of guide information makes it possible to identify, for example, for what purpose and in what direction people are moving. In a case where a request for presenting guide information is made by the user, the terminal apparatus 20 performs a guide information presenting process illustrated in FIG. 6.

In step ST11, the terminal apparatus 20 performs a guide information requesting process. The terminal apparatus 20 makes a request for guide information to the server apparatus 50 that provides guide information, and proceeds to step ST12. In requesting for guide information, the terminal apparatus 20 inserts information indicating a guide position, for example, the current position of the terminal apparatus 20, into the request for guide information, thereby allowing the server apparatus 50 to identify for which reference position guide information is necessary.

In step ST12, the terminal apparatus 20 acquires guide information. The terminal apparatus 20 acquires guide information supplied from the server apparatus 50 in response to the request for guide information, and proceeds to step ST13.

In step ST13, the terminal apparatus 20 presents the guide information. On the basis of the acquired guide information, the terminal apparatus 20 presents the user with information about for what purpose people are moving.

Figure 7:
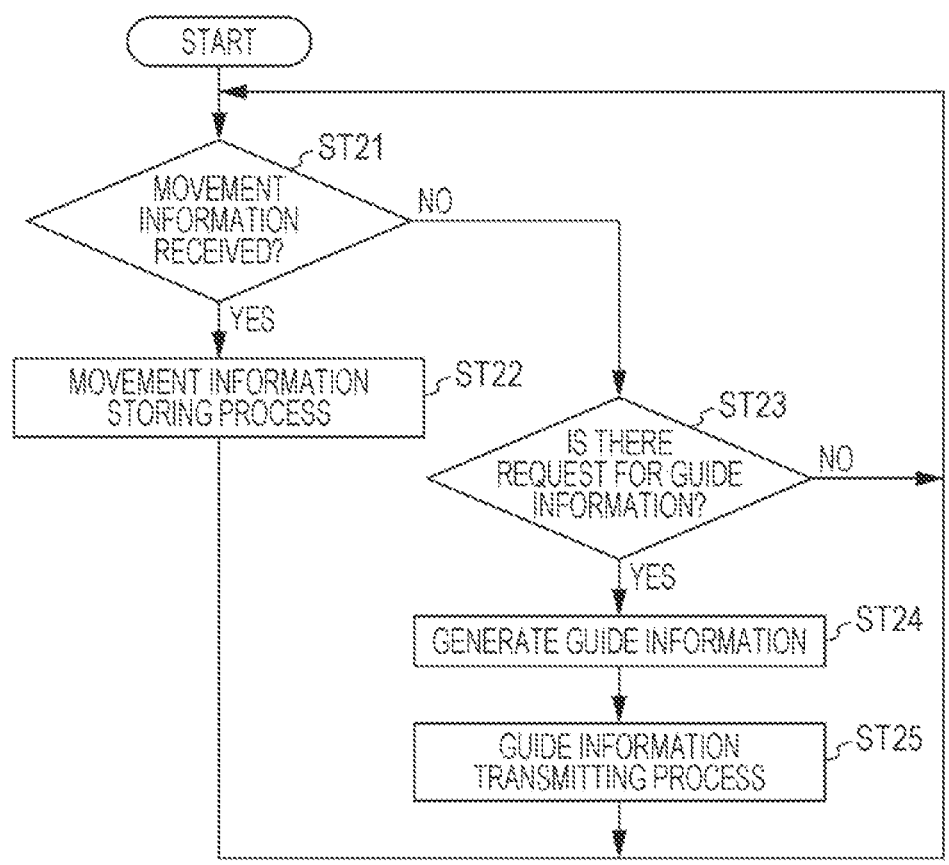
FIG. 7 is a flowchart illustrating a guide information presenting operation.

FIG. 7 is a flowchart illustrating a guide information presenting operation. In step ST21, the server apparatus 50 identifies whether or not movement information has been received. The server apparatus 50 proceeds to step ST22 in a case where movement information has been received from the terminal apparatus 20, and proceeds to step ST23 in a case where movement information has not been received.

In step ST22, the server apparatus 50 performs a movement information storing process. The server apparatus 50 stores the movement information supplied from the terminal apparatus 20 into the storage section 52, and returns to step ST21.

In step ST23, the server apparatus 50 identifies whether or not there is a request for guide information. The server apparatus 50 proceeds to step ST24 in a case where there is a request for guide information from the terminal apparatus 20, and returns to step ST21 in a case where there is no request for guide information.

In step ST24, the server apparatus 50 generates guide information. The server apparatus 50 generates guide information in a manner described later with reference to a position indicated in the request for guide information from the terminal apparatus 20, and proceeds to step ST25.

In step ST25, the server apparatus 50 performs a guide information transmitting process. The server apparatus 50 transmits the generated guide information to the terminal apparatus 20 that has requested for the guide information, and returns to step ST21.

FIG. 8 is a sequence diagram illustrating the operations of the terminal apparatus and server apparatus. The terminal apparatus 20 acquires positions during movement. In step ST31, the terminal apparatus 20 generates movement information including the acquired positions, position acquisition times, and a purpose of movement, and outputs the movement information to the server apparatus 50. In step ST32, the server apparatus 50 stores the movement information supplied from the terminal apparatus into the storage section 52.

In the case of presenting guide information related to the direction of movement and purpose of movement of other terminal apparatuses, in step ST41, the terminal apparatus 20 makes a request for guide information to the server apparatus 50 while inserting information indicating a guide position into the request. In step ST42, the server apparatus 50 sets a movement direction search range with reference to the guide position, and identifies the direction of movement of other terminal apparatuses within the movement direction search range by using movement information stored in the storage section 52. The server apparatus 50 also generates guide information indicating the identified direction of movement, and a purpose of movement for this direction of movement. In step ST43, the server apparatus 50 outputs the generated guide information to the terminal apparatus 20. The terminal apparatus 20 presents the direction of movement and purpose of movement of other terminal apparatuses on the basis of the guide information generated in the server apparatus 50.

Figure 9A:
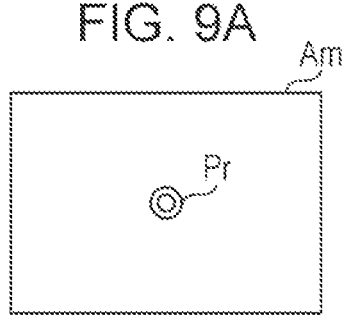
FIG. 9A is an explanatory diagram of a guide information generating operation.
Figure 9B:
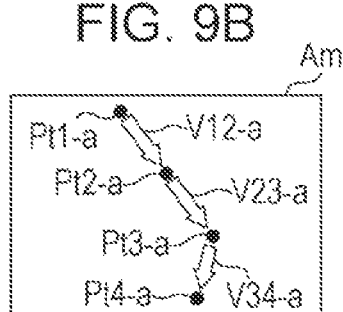
FIG. 9B is an explanatory diagram of a guide information generating operation.
Figure 9C:
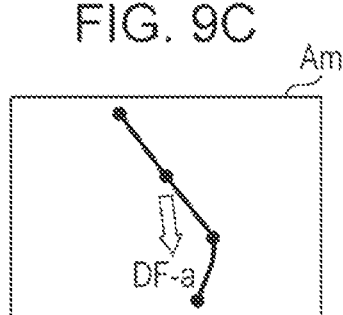
FIG. 9C is an explanatory diagram of a guide information generating operation.
Figure 9D:
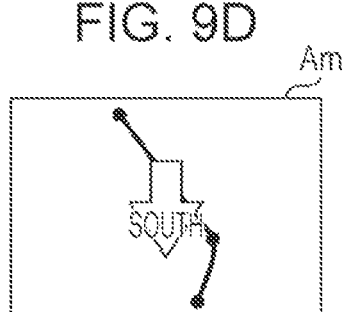
FIG. 9D is an explanatory diagram of a guide information generating operation.

FIGS. 9A to 9D are explanatory diagrams of a guide information generating operation. The guide information generating section 602 determines a movement direction search range Am as illustrated in FIG. 9A, for example, with reference to a guide position Pr indicated in a request for guide information. Next, the guide information generating section 602 calculates movement vectors on the basis of movement information. In a case where, as illustrated in FIG. 9B, positions Pt1-9, Pt2-a, Pt3-a, and Pt4-a are illustrated in time series order on the basis of movement information supplied from a terminal apparatus 20-a, the guide information generating section 602 calculates a movement vector V12-a indicating the distance and direction from the position Pt1-a to the position Pt2-a. Likewise, the guide information generating section 602 calculates movement vectors V23-a and V34-a from the position Pt2-a to the position Pt3-a and from the position Pt3-a to the position Pt4-a, respectively. The guide information generating section 602 calculates the average of the movement vectors calculated within the movement direction search range, and identifies which one of pre-defined directions the average movement vector corresponds to. For example, in a case where, as illustrated in FIG. 9C, the average movement vector is in a direction DF-a, and the pre-defined directions are eight directions (for example, south, south west, west, north west, north, north east, east, and south east), the direction closest to the direction DF-a, for example, "south" is identified as the direction of movement of the terminal apparatus 20-a as illustrated in FIG. 9D. In addition, a purpose of movement (for example, "shopping") is associated with the direction of movement (for example, "south"). Through such processing, it becomes apparent that a person carrying the terminal apparatus 20-a is moving in the direction of "south" near the guide position Pr for the purpose of, for example, "shopping".

By performing the same processing for each terminal apparatus, the guide information generating section 602 identifies, for each terminal apparatus, for what purpose and in what direction a person carrying the terminal apparatus is moving.

The guide information generating section 602 performs, for example, statistical processing with respect to direction of movement and purpose of movement, and identifies purposes of movement in decreasing order of the number of terminal apparatuses for each direction of movement. The guide information generating section may also identify directions of movement in decreasing order of the number of terminal apparatuses for each purpose of movement. The guide information generating section generates guide information on the basis of the identification results obtained in this way, and transmits the guide information to the terminal apparatus that has requested for the guide information.

Figure 10:
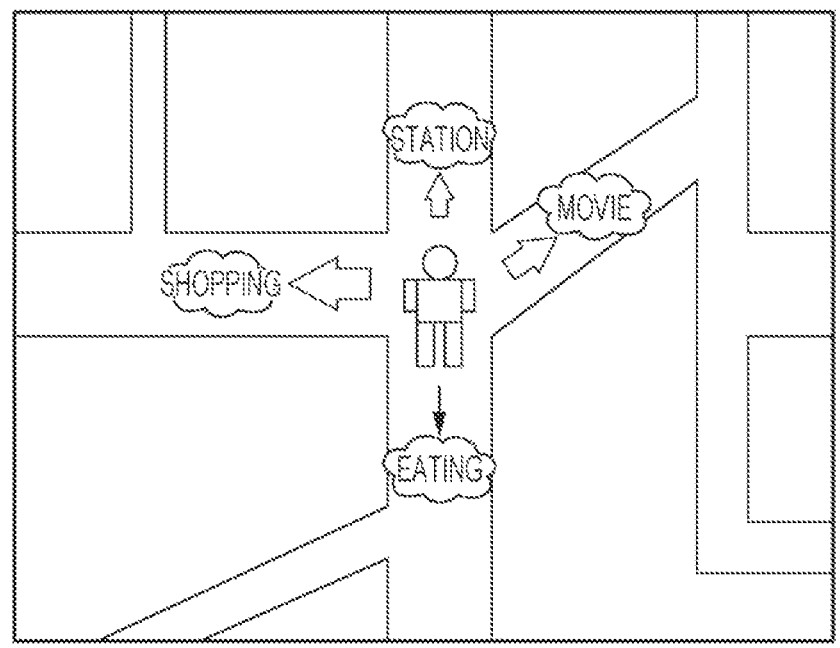
FIG. 10 illustrates a presentation example of guide information

FIG. 10 illustrates a presentation example of guide information. The terminal apparatus 20 superimposes a display based on guide information on, for example, a map that is being displayed on the display section 41. FIG. 10 illustrates a case where direction of people's movement (indicated by an arrow), and the most frequent purpose of movement for each direction of movement are displayed. Displaying direction of movement and purpose of movement in this way makes it possible for the user to identify for what purpose and in what direction other people are moving, and easily select the direction in which to move from now on by using these information. In addition, by changing the attribute of a display (for example, the color of a display) indicating direction of movement for each purpose of movement, the relationship between direction of movement and purpose of movement can be displayed in an easy-to-understand way.

In the presentation of guide information, more information can be acquired from displayed guide information by changing the attribute of the display in accordance with the number of movements and the frequency of purpose of movement. For example, in a case where the number of movements is large, the size of a display (for example, an arrow display) indicating the corresponding direction of movement is increased, and in a case where the number of movements is small, the size of a display indicating the corresponding direction of movement is reduced. In this way, it is possible to easy grasp in what direction there is a large number of movements, on the basis of the size of the display indicating direction of movement. In a case where the proportion represented by a purpose of movement is small, the size of a display indicating the corresponding purpose of movement (for example, a display of the name of a destination for that purpose) is increased, and in a case where the proportion is small, the size of a display indicating the corresponding purpose of movement is reduced. In this way, on the basis of the size of a display indicating purpose of movement, it is possible to easily grasp whether or not the proportion of movements for the displayed purpose of movement is large.

Figure 11:
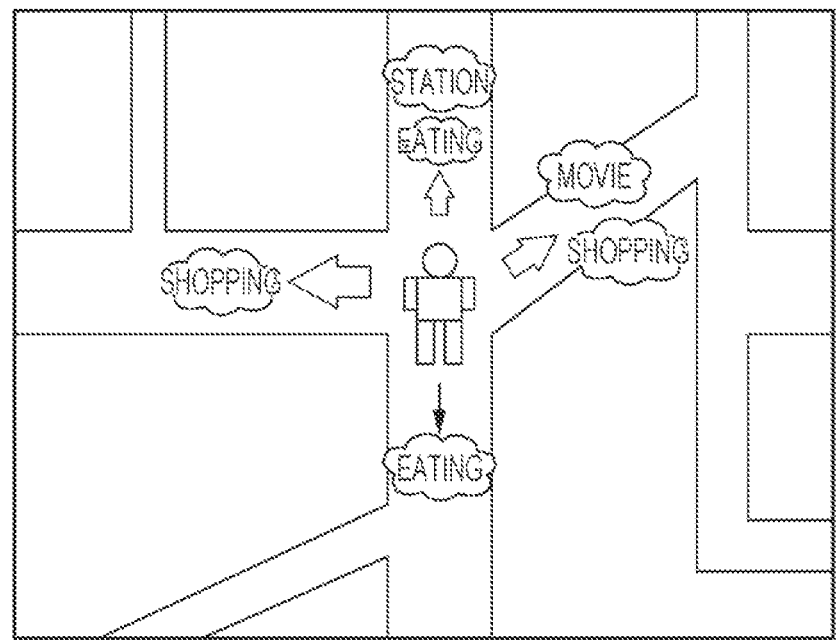
FIG. 11 illustrates another presentation example of guide information.

While FIG. 10 illustrates a case where the purpose of movement representing the largest proportion is displayed, a plurality of purposes of movement may be displayed in decreasing order of proportion as illustrated in FIG. 11. By presenting guide information in this way, not only the purpose of movement representing the largest proportion but also the purpose of movement representing the next largest proportion can be grasped. Further, by varying the size of the display with the proportion, it is also possible to grasp the difference in proportion, thereby enabling effective utilization of guide information.

While FIGS. 10 and 11 each illustrate a case where, as a guide display, the purpose of movement representing a large proportion is displayed for each direction of movement, the guide display may also indicate in what direction there is a large number of movements, with respect to a purpose of movement selected by the user.

Figure 12:
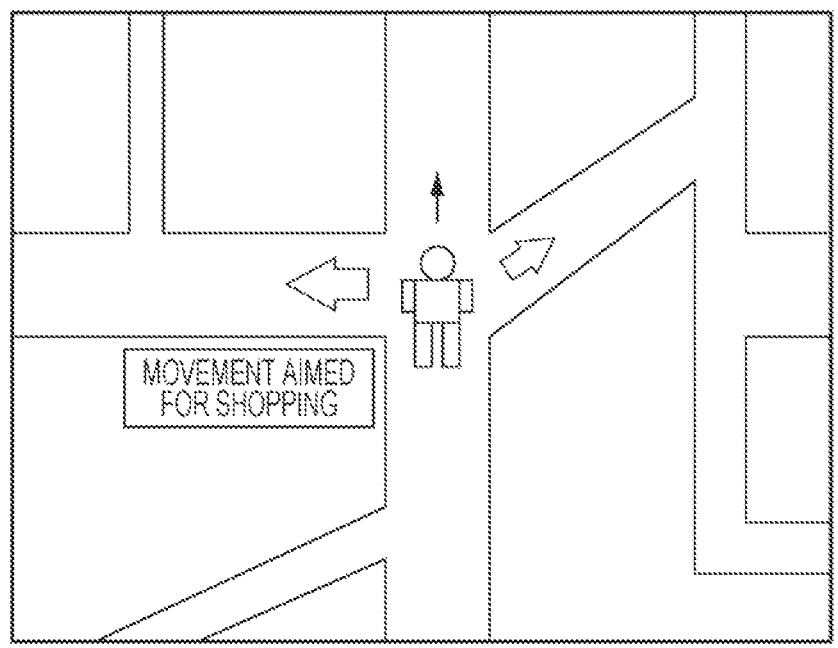
FIG. 12 illustrates a case where the situation of movement with respect to the purpose of movement selected by a user is presented.

FIG. 12 illustrates a case where the situation of movement with respect to a purpose of movement selected by the user is presented. For example, in a case where the user selects "shopping" as a purpose of movement, a display (for example, an arrow display) indicating the direction of movement aimed for shopping is provided. Moreover, the size of the display indicating the direction of movement is varied with the number of movements (frequency) aimed for shopping. By presenting guide information in this way, it is possible to identify the movement of people moving for the same purpose, allowing the user to decide what to do from now on by using the movement of people as a guide.

Figure 13:
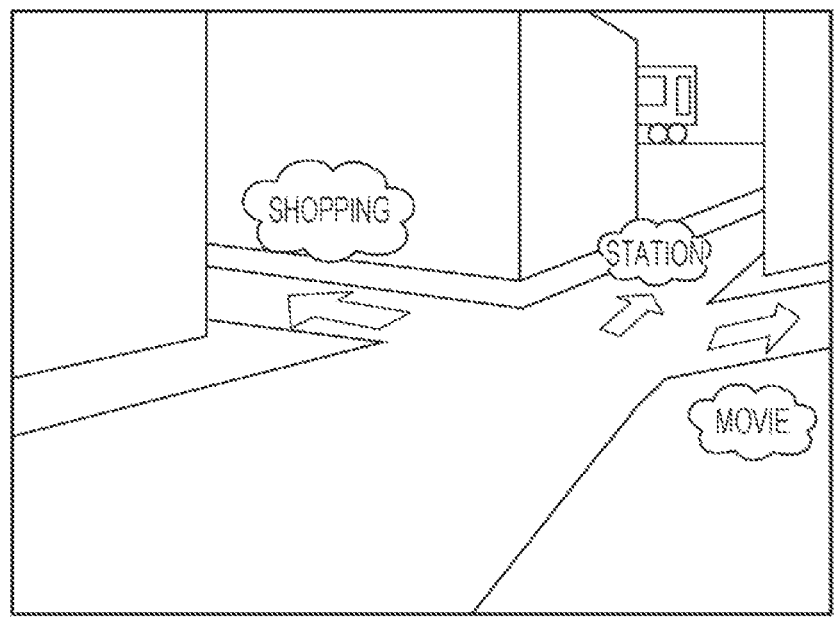
FIG. 13 illustrates a case where guide information is displayed while being superimposed on a captured image.

In a case where the terminal apparatus 20 is provided with the imaging section 37, guide information may be displayed while being superimposed on a captured image displayed on the display section 41. Specifically, the imaging direction is identified by acquiring the azimuth of the terminal apparatus 20 by the azimuth acquiring section 315 of the position acquiring section 31. Once the current position and the imaging direction are identified, guide information can be displayed while being superimposed on a captured image in the correct azimuth in accordance with the imaging direction. FIG. 13 illustrates a case where guide information is displayed while being superimposed on a captured image. By displaying guide information while superimposing the guide information on a captured image in this way, even a person who is not good at reading maps can easily grasp for what purpose and in what direction people are moving, by capturing an image of the surroundings. Therefore, guide information can be used in an easy and simple manner.

According to the information processing system 10 mentioned above, direction and purpose of people's movement can be presented to the user. Therefore, for example, even when visiting an area for the first time, it is possible for the user to go to a place where many restaurants are located, by moving in accordance with the direction of movement of people who are moving for the purpose of eating. In a case where the user has not yet decided what to do in the area, by referencing information about the purpose for which people are moving, the user can arrive at an interesting destination, for example, a famous tourist spot. Even in places frequently visited by the user, the user can learn movement of people moving for an unexpected purpose, or the fact that an event or the like the user does not know is being held.

(5. Other Operations of Terminal Apparatus and Server Apparatus)

Incidentally, the operations of the terminal apparatus 20 and server apparatus 50 are not limited to the operations mentioned above. For example, in the terminal apparatus 20, the method of setting a purpose of movement is not limited to a user's input operation but this setting may be performed automatically. For example, in a case where a navigation function is being used to set a destination, a purpose of movement is automatically set from the destination being set. In a case where a schedule management function is being used, a purpose of movement is automatically set in accordance with each scheduled action. By automatically setting a purpose of movement in this way, the purpose of movement can be automatically set in accordance with the user's action, without inputting the purpose of movement by the user.

The request for guide information may include not only information indicating a guide position but may include information on a position range for which to present guide information, for example, information indicating the display range of the map being currently displayed. In this case, the guide information generating section 602 of the server apparatus 50 divides the map display range into a plurality of regions, sets each of the divided regions as a movement direction search range, and generates guide information indicating the relationship between direction of movement and purpose of movement for each movement direction search range as described above. In this way, the terminal apparatus 20 can display direction of movement and purpose of movement at locations not only near the guide position but within the range of the map being displayed on the display section 41. Because direction of movement and purpose of movement can be displayed for each individual divided region (movement direction search range), it is possible for the terminal apparatus 20 to display, for example, the movement path for each purpose of movement.

Further, because movement information includes position acquisition times, it is possible for the guide information generating section 602 to use position acquisition times to present the relationship between direction of movement and purpose of movement within a designated time period by guide information. For example, the direction or purpose of people's movement differs between morning and afternoon. Therefore, if guide information including direction of movement or purpose of movement in the morning is generated in a case where the current time falls within the afternoon period, there is a possibility that the generated guide information may differ from the direction or purpose of people's movement in the afternoon period. Accordingly, the guide information generating section 602 selects movement information including position acquisition times within a designated time period, for example, within a predetermined time range that straddles the current time, and generates guide information by using the selected movement information. In this way, the guide information generating section 602 can generate guide information appropriate to the actual situation. Further, the guide information generating section 602 may select movement information by using not only time information but also date information or the like, and generate guide information by using the selected movement information. In this case, when designating a time period in generating guide information, not only time but also date or the like is designated. By selecting movement information by using date information or the like in this way, for holidays, it is possible to generate guide information appropriate to the direction of movement or purpose of movement on holidays. For weekdays, it is possible to generate guide information appropriate to the direction of movement or purpose of movement on weekdays.

Further, movement information may include information or the like indicating user's age or sex, and the guide information generating section 602 may generate guide information based on movement information that matches the sex or age included in a request for guide information. For example, the guide information generating section 602 selects movement information indicating a designated sex, and generates guide information from the selected movement information. The guide information generating section 602 may also select movement information indicating an age range that is set on the basis of a designated age, and generate guide information from the selected movement information. In this way, in a case where people are moving in the same direction but their purpose of movement differs depending on sex or age group, it is possible to present guide information appropriate to the user's sex or age. Therefore, guide information can be utilized more effectively.

(6. Another Configuration and Operation of Terminal Apparatus)

While the above-mentioned embodiment is directed to the case where guide information is generated in the server apparatus and provided to the terminal apparatus, guide information may be generated in the terminal apparatus. Next, a case where guide information is generated in the terminal apparatus will be described as another configuration and operation of the terminal apparatus.

Figure 14:
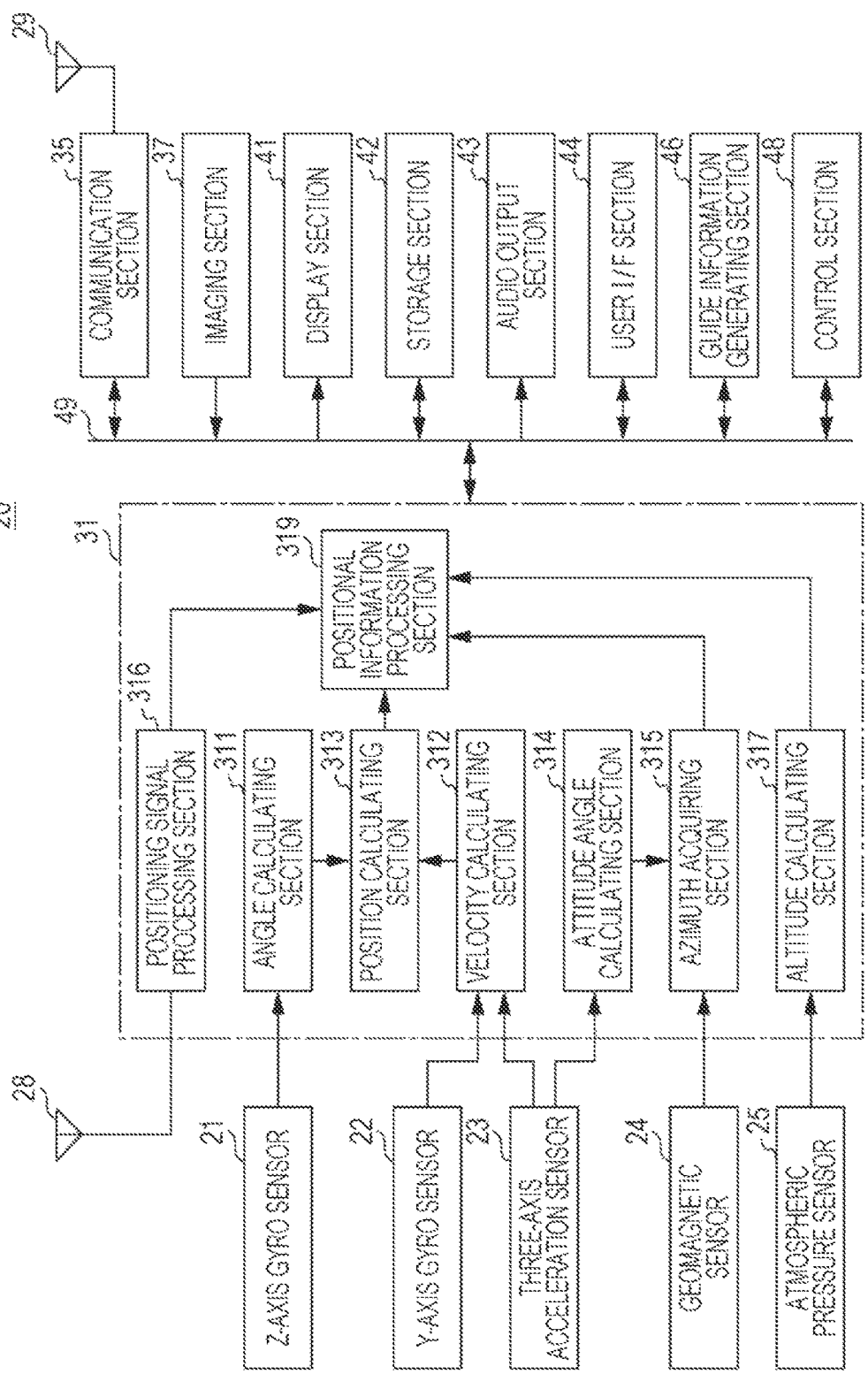
FIG. 14 illustrates another configuration of the terminal apparatus.

FIG. 14 illustrates another configuration of the terminal apparatus. A terminal apparatus 20 has a Z-axis gyro sensor 21, a Y-axis gyro sensor 22, a three-axis acceleration sensor 23, a geomagnetic sensor 24, an atmospheric pressure sensor 25, and antennas 28 and 29. The terminal apparatus 20 also has a position acquiring section 31, a communication section 35, an imaging section 37, a display section 41, a storage section 42, an audio output section 43, a user interface section 44, and a control section 48. Further, the terminal apparatus 20 is provided with a guide information generating section 46.

The Z-axis gyro sensor 21 detects yawing that is a motion around the Z-axis, and outputs a detection signal indicating the detected yaw rate to the position acquiring section 31. The Y-axis gyro sensor 22 detects pitching that is a motion around the Y-axis, and outputs a detection signal indicating the detected pitch rate to the position acquiring section 31. The three-axis acceleration sensor 23 detects an acceleration Ax along the X-axis, an acceleration Ay along the Y-axis, and an acceleration Az along the Z-axis. The three-axis acceleration sensor 23 outputs a detection signal indicating each of the detected accelerations to the position acquiring section 31. The geomagnetic sensor 24 detects the geomagnetism of each of the X-axis, Y-axis, and Z-axis directions, and outputs a detection signal to the position acquiring section 31. The antenna 28 receives positioning signals from a plurality of positioning satellites, for example, signals from global positioning system (GPS) satellites, and outputs the received signals to the position acquiring section 31.

As described above, the position acquiring section 31 acquires the current position on the basis of detection signals from the gyro sensors, the acceleration sensor, the atmospheric sensor, and the geomagnetic sensor, and received signals from the antenna. The positional acquiring section 31 may use a wireless local area network (LAN) or the like to acquire a position on the basis of, for example, positional information on each base station (access point) that is registered in advance, and the signal intensity of a radio signal from each base station. The position acquiring section 31 reads map data of the vicinity in which the current position is included, and generates a map image in which the current position is included and which is aligned with the current azimuth of the terminal apparatus 20. The positional acquiring section 31 displays the generated map image on the screen of the display section 41.

The antenna 29 is connected to the communication section 35. The communication section 35 communicates with a terminal base station (not illustrated) or another terminal apparatus via the antenna 29. The communication section 35 outputs movement information including positions acquired in the position acquiring section 31, position acquisition times, and a purpose of movement to another terminal apparatus 20. The communication section 35 also receives movement information supplied from another terminal apparatus 20, and outputs the movement information to the storage section 42.

The display section 41 is, for example, a display device that outputs a screen obtained by superimposing information indicating the current position on map data. The display section 41 also displays a menu for selecting a function of the terminal apparatus 20, performing various settings, or the like. Further, on the basis of guide information generated in the terminal apparatus 20, the display section 41 displays a guide that can be used for the user to decide what to do, on the screen.

The storage section 42 is a storage medium that stores a program for operating the terminal apparatus 20, map data, movement information supplied from other terminal apparatuses, and the like. The storage section 42 may be, for example, a storage medium including a non-volatile memory such as a flash ROM (or flash memory), an electrically erasable programmable read-only memory (EEPROM), and an erasable programmable ROM (EPROM), a magnetic disk such as a hard disk and a disk-shaped magnetic body disk, an optical disc such as a digital versatile disc recordable (DVD-R) and a Blu-Ray Disc (BD) (registered trademark), and a magneto optical (MO) disc.

The audio output section 43 is an output device that outputs audio data, and is configured by, for example, a speaker. The audio output section 43 outputs, for example, audio guidance related to navigation.

The user interface section 44 is configured by an operating switch or operating button, a touch panel integrally provided on the screen of the display section 41, or the like. The user interface section 44 accepts an operating instruction from the user, and outputs an operation signal indicating information on the operation to the control section 48. Examples of an operating instruction from the user include setting of a destination, enlarging and reducing of a map, audio guide settings, and screen display settings. The user interface section 41 may be a signal receiving section that detects an operation signal indicating an operating instruction from the user which is transmitted from a remote control.

The guide information generating section 46 generates guide information from movement information stored in the storage section 42. The guide information generating section 46 sets a movement direction search range with reference to a guide position indicated in a request for guide information. The guide information generating section 46 also performs, for each terminal apparatus, selection of movement information that indicates positions within the movement direction search range, and identification of a direction of movement based on the positions and position acquisition times of the selected movement information, and generates guide information indicating the identified direction of movement and a purpose of movement for this direction of movement. For example, by using positions within the movement direction search range in time series on the basis of their position acquisition times, the guide information generating section 46 identifies the directions of movement of the positions. Further, the guide information generating section 46 calculates the average of the identified directions, and identifies which one of pre-defined directions the average of the directions of movement corresponds to. By performing such processing for each terminal apparatus, the guide information generating section 46 determines the direction of movement for each terminal apparatus. The determined direction of movement is associated with a purpose of movement. By performing such processing, the guide information generating section 46 identifies the direction of movement and purpose of movement of a terminal apparatus that has moved within the movement direction search range. Further, the guide information generating section 46 performs statistical processing to identify the frequency of direction of movement and the frequency of purpose of movement for each direction of movement, the frequency of purpose of movement and the frequency of direction of movement for each purpose of movement, and the like. In addition, the guide information generating section 46 generates guide information on the basis of the results of such statistical processing.

The control section 48 causes the terminal apparatus 20 to operate in accordance with a user's operation, by controlling the operation of each section on the basis of an operation signal from the user interface section 44. The control section 48 is configured by a central processing unit (CPU), a read only memory (ROM), a random access memory (RAM), and the like. By executing a program stored in the ROM or the storage section 42, the CPU causes the terminal apparatus 20 to operate in accordance with a user's operation by controlling the operation of each section on the basis of an operation signal from the user interface section 44.

The control section 48 generates movement information by associating position acquisition times and a purpose of movement with positions acquired in the position acquiring section 31, and outputs the movement information to another terminal apparatus 20 from the communication section 35. In the case of presenting guide information, with the current position acquired by the position acquiring section 31 as a guide position, the control section 48 causes the display section 41 or the audio output section 43 to perform a guide display or output of an audio guide, on the basis of guide information generated in the guide information generating section 46 as described above.

The terminal apparatus 20 configured as described above acquires movement information from other terminal apparatuses 20 located within a communicable range, and generates guide information on the basis of this movement information. Therefore, it is possible to present guide information without communicating with the server apparatus 50. Because movement information is acquired from other terminal apparatuses located within a communicable range, guide information according to the current situation of movement of other terminal apparatuses can be generated. Therefore, the user can decide what to do from now on in accordance with the current situation of movement of other terminal apparatuses. Moreover, by making it possible to generate guide information by acquiring movement information from other terminal apparatuses 20 located within a communicable range, guide information can be presented even when it is not possible to communicate with the server apparatus 50 or when it takes time to communicate with the server apparatus 50.

The information processing apparatus that outputs movement information and the information processing apparatus that presents guide information may not necessarily be provided in a portable terminal apparatus carried by a person. These information processing apparatuses may be provided in, for example, on-vehicle equipment.

The series of processes described in this specification can be executed by hardware, software, or a composite configuration of both. If the series of processes is to be executed by software, the series of processes can be executed by installing a program recording the processing sequence into a memory in a computer embedded in dedicated hardware. Alternatively, the series of processes can be executed by installing the program into a general purpose computer capable of executing various processes.

For example, the program can be pre-recorded on a hard disk or a read only memory (ROM) as a recording medium. Alternatively, the program can be stored (recorded) temporarily or permanently on a removable recording medium such as a flexible disc, a compact disc read only memory (CD-ROM), a magneto optical (MO) disc, a digital versatile disc (DVD), a magnetic disk, or a semiconductor memory. Such a removable recording medium can be provided as so-called packaged software.

Other than being installed into a computer from a removable recording medium, the program can be transferred to a computer in a wireless or wired manner from a download site via a network such as a local area network (LAN) or the Internet. The computer can receive the program thus transferred and install the program into a built-in recording medium such as a hard disk.

The present technology is not to be construed as being limited to the embodiment of the technology described above. The embodiment of the technology discloses the present technology as an example only, and it is obvious that a person skilled in the art can make various modifications to and substitutions for the embodiment without departing from the scope of the present technology. That is, the scope of the present technology is be determined with reference to the appended claims.

An information processing apparatus according to an embodiment of the present technology can be also configured as follows.

(1) An information processing system comprising:
an acquisition section configured to acquire a movement direction and a movement purpose from each one of a plurality of terminal devices; and
a guide information issuing section configured to issue a guide information which is generate based on the movement direction and the movement purpose of the a plurality of terminal devices.

(2) The system of (1), wherein
the guide information is provided to a requesting terminal devise in response to a request from the requesting terminal device, and
the guide information issuing section generates the guide information based on a guide position representing a geographic location, and the guide information identifies at least one of the movement direction, the movement purpose, and a movement destination associated with selected ones of the plurality of terminal devices that are located within a movement direction search range that is set based on the guide position.

(3) The system of (2), wherein the geographic location represented by the guide position is a location associated with the requesting terminal device.

(4) The system of (3), wherein the location associated with the requesting terminal device is a current location of the requesting terminal device.

(5) The system of (1), wherein the displayed guide information comprises at least one indicator that indicates at least one of the movement direction, the movement purpose, and the movement destination associated with the selected ones of the plurality of terminal devices.

(6) The system of (1), further comprising a displaying section configured to display the guide information to be superimposed on an image.

(7) The system of (6), wherein the image is a map.

(8) The system of (6), wherein the image is a captured image.

(9) The system of (1), wherein the guide information is further generated based on a number of the selected ones of the plurality of terminal devices located within a movement direction search range and having a substantially same movement direction.

(10) The system of (1), wherein the guide information is further generated based on a number of the selected ones of the plurality of terminal devices located within a movement direction search range having a substantially same movement purpose.

(11) The system of (1), wherein the guide information is further generated based on a number of the selected ones of the plurality of terminal devices located within a movement direction search range having a substantially same movement direction and a substantially same movement purpose.

(12) The system of (1), wherein the guide information comprises a plurality of indicators including at least a first indicator of the movement direction associated with the selected ones of the plurality of terminal devices and at least a second indicator of the movement purpose associated with the selected ones of the plurality of terminal devices.

(13) The system of (11), wherein the guide information is updated upon a selection of one of the plurality of indicators.

(14) The system of (1), wherein the guide information comprises at least a first indicator of the movement destination and at least a second indicator of the movement purpose.

(15) The system of (1), wherein the guide information is further generated based on at least one of an age of a user and a gender of the user.

(16) The system of (1), wherein the guide information comprises a plurality of moving directions and purposes.

(17) The system of (1), wherein the guide information comprises a plurality of moving destinations and purposes.

(18) The system of (1), the guide information is generated based on time information which is associated with the movement direction or the movement purpose.

(19) A method comprising:
acquiring a movement direction and a movement purpose from each one of a plurality of terminal devices; and
issuing a guide information which is generate based on the movement direction and the movement purpose of the a plurality of terminal devices.

(20) A non-transitory computer-readable medium having embodied thereon a program, which when executed by a computer causes the computer to perform a method, the method comprising:
acquiring a movement direction and a movement purpose from each one of a plurality of terminal devices; and
issuing a guide information which is generate based on the movement direction and the movement purpose of the a plurality of terminal devices.

(21) A system comprising:
an obtaining section configured to obtain a guide information, and
a display section configured to display the guide information on a display,
wherein the guide information identifies at least one of movement direction, movement purpose, and movement destination associated with selected ones of a plurality of other devices that are located within a movement direction search range that is set based on a geographic location.

(22) The system of (21), wherein the geographic location upon which the movement direction search range is set is a location associated with at least one of a position, a direction of movement, and a destination of the system.

(23) The system of (21), further comprising:
a movement purpose setting section configured to set a movement purpose of the system; and
a position acquisition section configured to acquire a position of the system.

(24) The system of (21), wherein the obtaining section obtains the guide information by generating the guide information based on the identified at least one of movement direction, movement purpose, and movement destination associated with the selected ones of the plurality of other devices.

(25) The system of (21), wherein a server transmits the guide information and the obtaining section receives the transmitted guide information.

(26) The system of claim (21), wherein the geographic location is a location associated with the system.

(27) The system of (26), wherein the location associated with the system is a current location of the system.

(28) The system of (21), further comprising a displaying section configured to display the guide information to be superimposed on a map.

(29) The system of (28), wherein the displayed guide information comprises at least one indicator that indicates at least one of the movement direction, the movement purpose, and the movement destination associated with the selected ones of the plurality of other devices.

(30) The system of (21), further comprising a displaying section configured to display the guide information to be superimposed on an image.

(31) The system of (30), wherein the image is a captured image.

(32) The system of (21), wherein the guide information is generated based on a number of the selected ones of the plurality of other devices located within the movement direction search range and having a same movement direction.

(33) The system of (21), wherein the guide information is generated based on a number of the selected ones of the plurality of terminal devices located within the movement direction search range having a same movement purpose.

(34) The system of (21), wherein the guide information is generated based on a number of the selected ones of the plurality of terminal devices located within the movement direction search range having a same movement direction and a same movement purpose.

(35) The system (21), wherein the guide information comprises a plurality of indicators including at least a first indicator of the movement direction and at least a second indicator of the movement purpose.

(36) The system of (35), wherein the guide information is updated upon a selection of one of the plurality of indicators.

(37) The system of (1), wherein the guide information comprises at least a first indicator of the movement destination and at least a second indicator of the movement purpose.

(38) The system of (1), wherein the guide information is generated based on at least one of an age of a user and a gender of the user.

(39) The system of (1), wherein the guide information comprises a plurality of moving directions and purposes.

(40) The system of (1), wherein the guide information comprises a plurality of moving destinations and purposes.

(41) A method comprising:
acquiring a guide information at a terminal device upon request; and displaying the guide information on a display,
wherein the guide information identifies at least one of movement direction, movement purpose, and movement destination associated with selected ones of a plurality of other devices that are located within a movement direction search range that is set based on a geographic location.

(42) A non-transitory computer-readable medium having embodied thereon a program, which when executed by a computer causes the computer to perform a method, the method comprising:
acquiring a guide information at a terminal device upon request; and
displaying the a guide information on a display,
wherein the guide information identifies at least one of movement direction, movement purpose, and movement destination associated with selected ones of a plurality of other devices that are located within a movement direction search range that is set based on a geographic location.

(43) A system comprising:
a first system comprising:
an acquisition section configured to acquire a movement direction and a movement purpose from each one of a plurality of terminal devices; and
a guide information issuing section configured to issue a guide information which is generate based on the movement direction and the movement purpose of the a plurality of terminal devices.
a second system comprising:
the requesting terminal device,
wherein the requesting terminal device comprising an acquisition section configured to acquire the generated guide information; and
a display section configured to display the guide information.

(44) An information processing apparatus including:
a movement information acquiring section that acquires movement information from external apparatuses, the movement information including positions acquired during movement, position acquisition times, and a purpose of movement; and
a guide information generating section that performs, for each of the external apparatuses, selection of movement information indicating positions within a movement direction search range from the movement information acquired by the movement information acquiring section, and identification of a direction of movement based on positions and position acquisition times of the selected movement information, and generates guide information indicating the identified direction of movement and a purpose of movement for the direction of movement.

(45) The information processing apparatus according to (44), wherein the guide information generating section uses the positions of the selected movement information in order of their position acquisition times to calculate a movement vector between the positions, and identifies the direction of movement on a basis of the calculated movement vector.

(46) The information processing apparatus according to (44) or (45), wherein the guide information generating section identifies a frequency for each purpose of movement, and determines the purpose of movement for the direction of movement on a basis of identification results.

(47) The information processing apparatus according to any one of (44) to (46), wherein in accordance with designation of a time period, the guide information generating section selects movement information including position acquisition times within the designated time period, and generates the guide information from the selected movement information.

(48) The information processing apparatus according to any one of (44) to (47), wherein:
the movement information includes information on sex or age; and
the guide information generating section selects movement information indicating a sex designated in accordance with sex designation, selects movement information indicating an age range that is set on a basis of an age designated in accordance with age designation, and generates the guide information from the selected movement information.

(49) The information processing apparatus according to (44) to (48), wherein in accordance with designation of a purpose of movement, the guide information generating section selects a direction of movement corresponding to the designated purpose of movement from directions of movement individually identified for the external apparatuses, and generates guide information indicating the selected direction of movement.

(50) The information processing apparatus according to (44) to (49), wherein in accordance with designation of a position range for which to present the guide information, the guide information generating section divides the position range into regions, and generates the guide information by setting each of the divided regions as the movement direction search range.

(51) The information processing apparatus according to (44) to (50), further including a guide presenting section that presents a direction of movement and a purpose of movement on a basis of the guide information generated by the guide information generating section.

(52) The information processing apparatus according to (51), further including a position acquiring section that acquires a current position,
wherein the guide information generating section sets the movement direction search range with reference to the current position acquired by the position acquiring section.

(53) An information processing apparatus including:
a guide information requesting section that makes a request for guide information to a guide information generating apparatus, the guide information generating apparatus being configured to acquire movement information including positions acquired during movement, position acquisition times, and a purpose of movement from external apparatuses, perform, for each of the external apparatuses, selection of movement information indicating positions within a movement direction search range from the acquired movement information, and identification of a direction of movement based on positions and position acquisition times of the selected movement information, and generate the guide information indicating the identified direction of movement and a purpose of movement for the direction of movement; and
a guide presenting section that presents a direction of movement and a purpose of movement, on a basis of the guide information supplied from the guide information generating apparatus in response to the request for the guide information.

(54) The information processing apparatus according to (53), wherein the guide presenting section displays a map, and displays a direction of movement and a purpose of movement on the map on a basis of the guide information.

(55) The information processing apparatus according to (53) or (54), further including:
an imaging section that generates a captured image; and
an azimuth acquiring section that acquires an azimuth of the captured image, wherein the guide presenting section displays the captured image generated by the imaging section, and displays a direction of movement and a purpose of movement on the captured image on a basis of the guide information while aligning the azimuth of the captured image acquired by the azimuth acquiring section with an azimuth in the direction of movement.

INDUSTRIAL APPLICABILITY

According to an information processing apparatus, an information processing method, a program, and an information processing system according to an embodiment of the present disclosure, movement information including positions acquired during movement, position acquisition times, and a purpose of movement is acquired from external apparatuses, and for each of the external apparatus, movement information indicating positions within a movement direction search range is selected from the acquired movement information, and a direction of movement is identified on the basis of positions and position acquisition times of the selected movement information. Further, guide information indicating the identified direction of movement and a purpose of movement for the direction of movement is generated. Consequently, by presenting the guide information, the user can grasp the situation of people's movement including the purpose of movement, and can utilize the guide information as, for example, useful information for deciding what to do from now on. Therefore, the present technology is suitable for portable terminals such as a cellular phone, a smart phone, a personal digital assistant (PDA), and a tablet terminal, navigation apparatuses or the like, and information processing systems using these terminals and apparatuses.

REFERENCE SIGNS LIST

10 Information processing system
20 Terminal apparatus
21 Z-axis gyro sensor
22 Y-axis gyro sensor
23 Three-axis acceleration sensor
24 Geomagnetic sensor
25 Atmospheric pressure sensor
28, 29 Antenna
31 Position acquiring section
35 Communication section
37 Imaging section
41 Display section
42 Storage section
43 Audio output section
44 User interface section
46 Guide information generating section
48 Control section
50 Server apparatus
51 Communication section
52 Storage section
53 Input section
54 Output section
60 Control section
90 Network
311 Angle calculating section
312 Velocity calculating section
313 Position calculating section
314 Attitude angle calculating section
315 Azimuth acquiring section
316 Positioning signal processing section
317 Altitude calculating section
319 Positional information processing section
601 Received information processing section
602 Guide information generating section

The invention claimed is:
1. An information processing system comprising:
circuitry configured to
acquire a movement direction and a movement purpose from each one of a plurality of terminal devices, to obtain a plurality of movement directions and a plurality of movement purposes of the plurality of terminal devices, and
issue a guide information which is statistically generated based on the plurality of movement directions and the plurality of movement purposes of the plurality of terminal devices, the statistically-generated guide information identifying, for each respective direction of the plurality of movement directions of the plurality of terminal devices, frequency of the respective direction of movement and frequency of purpose of movement,
wherein the movement purpose corresponds to a user action performed at a movement destination that is a specified location associated with a conclusion of the movement purpose.
2. The system of claim 1, wherein
the guide information is provided to a requesting terminal device in response to a request from the requesting terminal device, and
the guide information is generated based on a guide position representing a geographic location, and the guide information identifies at least one of the movement direction, the movement purpose, and a movement destination associated with selected ones of the plurality of terminal devices that are located within a movement direction search range that is set based on the guide position.
3. The system of claim 2, wherein the geographic location represented by the guide position is a location associated with the requesting terminal device.
4. The system of claim 3, wherein the location associated with the requesting terminal device is a current location of the requesting terminal device.
5. The system of claim 2, wherein the guide information comprises at least one indicator that indicates at least one of the movement direction, the movement purpose, and the movement destination associated with the selected ones of the plurality of terminal devices.
6. The system of claim 2, wherein the guide information is further generated based on a number of the selected ones of the plurality of terminal devices located within a movement direction search range and having a substantially same movement direction.
7. The system of claim 2, wherein the guide information is further generated based on a number of the selected ones of the plurality of terminal devices located within a movement direction search range having a substantially same movement purpose.
8. The system of claim 2, wherein the guide information is further generated based on a number of the selected ones of the plurality of terminal devices located within a movement direction search range having a substantially same movement direction and a substantially same movement purpose.
9. The system of claim 1, wherein the circuitry is further configured to initiate a displaying of the guide information to be superimposed on an image.

10. The system of claim 9, wherein the image is a map.

11. The system of claim 9, wherein the image is a captured image.

12. The system of claim 1, wherein the guide information comprises a plurality of indicators including at least a first indicator of the movement direction associated with selected ones of the plurality of terminal devices and at least a second indicator of the movement purpose associated with selected ones of the plurality of terminal devices.

13. The system of claim 12, wherein the guide information is updated upon a selection of one of the plurality of indicators.

14. The system of claim 1, wherein the guide information comprises at least a first indicator of the movement destination and at least a second indicator of the movement purpose.

15. The system of claim 1, wherein the guide information is further generated based on at least one of an age of a user and a gender of the user.

16. The system of claim 1, wherein the guide information comprises a plurality of moving directions and purposes.

17. The system of claim 1, wherein the guide information comprises a plurality of moving destinations and purposes.

18. The system of claim 1, wherein the guide information is generated based on time information which is associated with the movement direction or the movement purpose.

19. The system of claim 1, wherein the movement purpose is shopping.

20. The system of claim 1, wherein the movement purpose is descriptive of an activity involving the user action that occurs or is arranged to occur at the specified location of the movement destination.

21. The system of claim 1, wherein the statistically-generated guide information further identifies, for each respective purpose of the plurality of movement purposes of the plurality of terminal devices, frequency of the respective purpose of movement and frequency of direction of movement.

22. A method comprising:
acquiring a movement direction and a movement purpose from each one of a plurality of terminal devices, to obtain a plurality of movement directions and a plurality of movement purposes of the plurality of terminal devices; and
issuing a guide information which is statistically generate based on the plurality of movement directions and the plurality of movement purposes of the plurality of terminal devices, the statistically-generated guide information identifying, for each respective direction of the plurality of movement directions of the plurality of terminal devices, frequency of the respective direction of movement and frequency of purpose of movement,
wherein the movement purpose corresponds to a user action performed at a movement destination that is a specified location associated with a conclusion of the movement purpose.

23. A non-transitory computer-readable medium having embodied thereon a program, which when executed by a computer causes the computer to perform a method, the method comprising:
acquiring a movement direction and a movement purpose from each one of a plurality of terminal devices, to obtain a plurality of movement directions and a plurality of movement purposes of the plurality of terminal devices; and
issuing a guide information which is statistically generate based on the plurality of movement directions and the plurality of movement purposes of the plurality of terminal devices, the statistically-generated guide information identifying, for each respective direction of the plurality of movement directions of the plurality of terminal devices, frequency of the respective direction of movement and frequency of purpose of movement,
wherein the movement purpose corresponds to a user action performed at a movement destination that is a specified location associated with a conclusion of the movement purpose.

* * * * *